April 20, 1965     E. J. KRUEGER     3,178,801
CUTTING TOOL ASSEMBLY
Filed Jan. 15, 1964
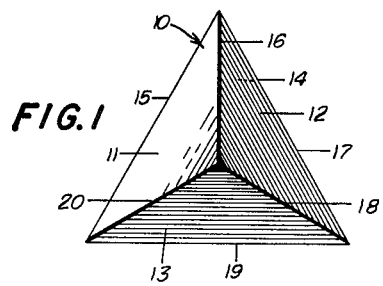
FIG.1
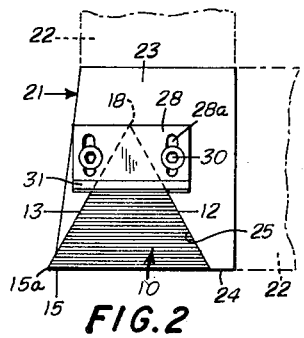
FIG.2
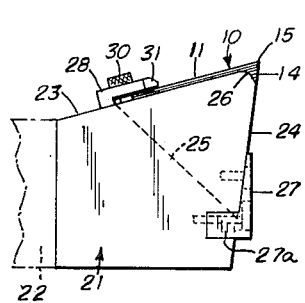
FIG.3
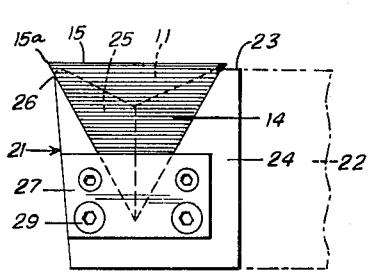
FIG.4
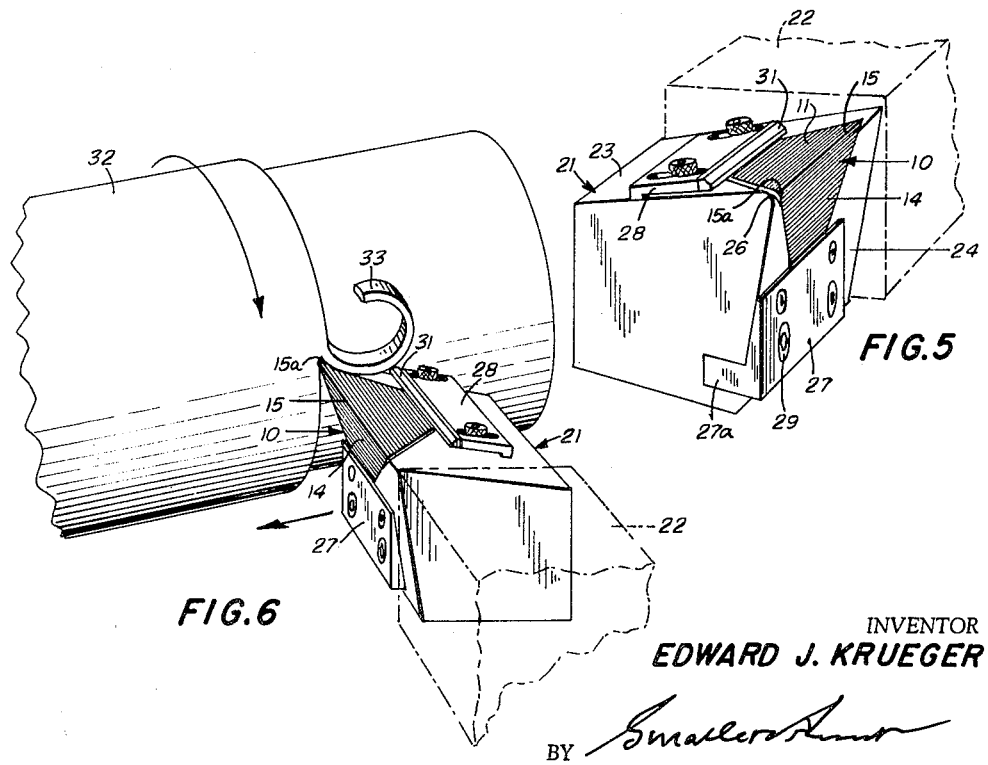
FIG.5
FIG.6
INVENTOR
EDWARD J. KRUEGER
BY
ATTORNEY United States Patent Office 3,178,801
Patented Apr. 20, 1965

3,178,801
CUTTING TOOL ASSEMBLY
Edward J. Krueger, North Tonawanda, N.Y., assignor to Iroquois Tool Supply Co., Inc., Tonawanda, N.Y.
Filed Jan. 15, 1964, Ser. No. 337,845
4 Claims. (Cl. 29—96)

This invention relates to a metal cutting tool assembly and consists more particularly in new and useful improvements in a cutting insert or bit of tetrahedral shape and means for indexably mounting the same in a tool holder, to provide a maximum of strength and support substantially perpendicular to the cutting pressures, while at the same time, effecting a considerable economy through the utilization of a minimum of volume of cutting insert or bit metal.

For many years metallurgists have undertaken to increase the transverse rupture strength of cutting materials and tool manufacturers have designed various tool holders in efforts to reduce the effects of cutting pressures and clamping pressures on standard inserts. Conventional tipped tools, both of the brazed type or mechanically held, indexable inserts, have all had one feature in common, namely, the inserts all have parallel faces. Furthermore, the thickness of these inserts is relatively small as compared to other dimensions, due to the fact that economic considerations have limited their thickness to a point no greater than that necessary to keep breakage within tolerable limits on cutting applications of average severity. With cutting pressures more or less vertical to the tool faces, the brittle tools with thin cross sections are easily broken.

In addition, tool holders have been designed to provide increased support for the inserts and so reduce the effects of transverse cutting pressures, but these designs have only been partially successful. One cause of their failure has been due to the result of heat generated by sustained cutting. The thin tips permit heat to rapidly penetrate to the supporting metal and when this metal is steel, it is softened by the heat, and breakage of the tip will result. To overcome this effect of heat, carbide anvils have sometimes been inserted between the cutting tip and the steel shank, and this is helpful to some extent if the faces of the cutting tips and of the anvils are both perfectly flat. However, if not, there is a focal point at which the insert can be easily broken by either cutting pressures or by clamping pressures.

While certain of the above-mentioned difficulties have, in some instances, been reduced by a conventional insert known as a "slug," these large masses of carbide are extremely expensive and are practical only when negative rake cutting is acceptable. Therefore, they are used infrequently.

It is the primary object of the present invention to provide a cutting tool which combines all of the advantages of strength, clearance angles, support, heat absorption, and economy, attempted by previous structures, but without sacrificing any of the important advantages.

Another object of the invention is to provide a cutting tool insert of a geometric solid embodying a shape which is inherently stronger than the flat inserts in conventional use and can thus withstand greater cutting pressures without being damaged.

A further object of the invention is to utilize as a cutting tool insert, a tetrahedron of carbide or other suitable cutting material, all axes, sides, angles and cutting edges of which are respectively identical, thereby providing for universal indexability.

A still further object of the invention is to provide a tool holder designed to support a carbide or other insert of tetrahedral shape so that the supporting surfaces are more nearly perpendicular to the cutting pressures, to thereby permit the use of relatively thin plates for securing the insert in place.

Still another object of the invention is to provide an economical carbide insert wherein the area of the cross section behind the cutting edge decreases rapidly, thus providing a considerable mass support where it is needed adjacent the cutting edge, and a minimum of mass where it is not needed.

A further object of the invention is to provide a metal cutting tool assembly wherein an optimum relief or clearance angle is available, while at the same time providing maximum supporting surfaces adjacent the cutting edge and wherein a high degree of positive rake is secured.

A still further object of the invention is to provide a cutting tool assembly having a wide range of possible rake angles without the necessity of changing the insert or the tool holder, by simply presenting the insert to a diamond wheel in such a position that a chamfer will be ground on the cutting edge at the desired angle. As the chamfer need only be as wide as the feed rate being used, very little carbide need be removed which will not materially effect strength of the tool.

With the above and other objects in view which will appear as the description proceds, the invention consists in the novel features herein set forth, illustrated in the accompanying drawings, and more particularly pointed out in the appended claims.

Referring to the drawings in which numerals of like character designate similar parts throughout the several views:

FIG. 1 is a perspective view of a tetrahedron insert such as embodied in the present invention;

FIG. 2 is a top plan view on a reduced scale, of a tool holder head with the insert in place;

FIG. 3 is an end view of the tool holder head;

FIG. 4 is an elevational view of the head and insert taken at the clearance face;

FIG. 5 is a perspective view of the head with the insert in place; and

FIG. 6 is a perspective view showing the assembly in operation.

Referring first to FIG. 1 of the drawings, the insert is generally represented by the numeral 10 and consists of an equilateral tetrahedron comprising a solid mass of carbide or other suitable cutting material. Being an equilateral tetrahedron, the insert has four identical faces 11, 12, 13 and 14, the latter not being visible in FIG. 1, but lying behind the faces 11, 12 and 13. Respective adjacent faces converge and terminate in six available cutting edges 15, 16, 17, 18, 19 and 20, the cutting edges and the angles of convergence being respectively identical.

The insert of the present invention is adaptable for use with a variety of tool holders, such, for example, as the conventional tool holder shank having a head at one end, or a rotatable milling cutter having a series of peripherally arranged insert supporting elements. For purposes of illustration, the drawings show the insert as used in the head of a tool holder shank, and as seen in FIG. 2, the head 21 may be arranged on the end of the shank 22 so as to present the cutting edge of the insert transversely across the end of the shank or substantially right angularly to the end, along one of the longitudinal edges of the shank which, in both instances, is shown in dotted lines. The head per se and its angular relationship to the shank may be varied to meet the requirements of the particular work to be done and the type of equipment employed. The drawings represent a more or less typical application of the invention.

In the form illustrated, the head 21 is integral with the shank 22 and its top and front surfaces 23 and 24 respectively, are angularly reduced or inwardly offset to accommodate the insert 10 and properly present its selected cutting edge to the work, as will later appear. The front or clearance surface 24 is inwardly and downwardly offset at a suitable angle to provide for clearance with the material being worked on, and its upper edge converges with the adjacent forward edge of the top or tool presenting surface 23 which is disposed at a suitable angle to accommodate the insert 10 when in place.

As best seen in FIG. 4, a V-shaped insert receiving trough shown in dotted lines at 25, is recessed in the head 21, transversely and angularly intersecting the front upper longitudinal edge of the head and the converging surfaces 23 and 24. The trough 25 has a depth and angular side boundaries complementary to any two of the converging faces of the insert 10, so as to receive the latter with its other two converging faces substantially flush with the respective adjacent converging surfaces 23 and 24 of the head, and present the cutting edge formed by the other two converging faces of the insert in cutting position. The angular forward corner of the wall of the trough adjacent the end of the head is preferably ground off as at 26 to permit the leading corner 15a at the extremity of the cutting edge 15 of the insert 10 to protrude, as best seen in FIGS. 4 and 5, for engagement with the material being worked on.

The insert 10 is retained in place in the trough 25 by means of a front clamping plate 27 and a top clamping plate 28. The front clamping plate 27 may be held in place by Phillips screws 29 and overlies the lower angular extremity of the insert 10, the angle of the front surface 24 of the head and the corresponding angle of the front or clearance face 14 of the insert, being such as to provide sufficient clearance between the insert, the clamping plate 27 and the material being worked on. Preferably, the plate 27 is provided with an inwardly directed flange 27a which fits in a complementary groove extending across the lower portion of the front surface 24 of the head to lend rigidity. The top plate 28 is preferably provided with adjusting slots 28a which receive locking screws 30, threaded in the top surface 23 of the head. The purpose of these slots is to permit adjustment of the plate 28 with respect to the insert 10, whereby the plate 28 may also serve as a chip breaker or director, as seen in FIG. 6. In other words, the plate 28 may be adjusted toward or away from the cutting edge 15 of the insert to facilitate control of its chip breaking function. Also, preferably, the forward edge of the plate 28 is beveled as at 31 and provided with a carbide overlay which is brazed to the plate so as to minimize wear.

It will be apparent that by utilizing an equilateral tetrahedron as a cutting insert and predetermining the angle of inclination of the base of the trough 25, so that the generally vertical axis of the trough is coincident that that of the insert, the selected cutting edge 15, in this instance, is presented to the material being worked on with an optimum of mass support in and behind the front face 14 of the insert, directly underlying the cutting edge 15. It will also be apparent that the mass of the insert behind the front face 14 uniformly and gradually decreases rearwardly of the insert so that where mass is not needed for supporting purposes, it is reduced to a minimum.

One of the major features of the tetrahedron insert of this invention resides in its inherent strength and its universal indexability for the utilization of at least four and possibly all six cutting edges. Regardless of the position of the insert in the head, this same maximum underlying support is made available for the selected cutting edge.

In operation, as seen in FIG. 6, the tool holder head 21 and insert 10 are presented to the periphery of a metal cylinder 32 for example, and the tool holder 22 is progressively advanced to the left as the cylinder 32 rotates, all by conventional mechanism. The cutting edge 15 is presented with an optimum positive rake angle and as the periphery of the cylinder is progressively cut away, the chip 33 is deflected by the chip breaker edge 31 of the top plate 28 as shown. It will be apparent that the angle of presentation of the insert 10 is such as to provide adequate clearance for the front face 14 of the insert and the securing plate 27, while at the same time providing a maximum of underlying, substantially perpendicular support for the cutting edge 15.

As previously pointed out, if it is desired to vary the rake angle of the insert cutting edge, this can be done by simply presenting the cutting edge to a diamond wheel in such a position that a chamfer will be ground thereon at the desired angle. Thus, it is unnecessary to change the insert or the tool holder to accomplish an adjustment of the rake angle. Also, in some instances, it may be desirable to grind off the extreme point of the cutting edge at the leading end of the insert to prevent breaking off of the tip.

A tetrahedron is peculiarly adaptable for use as a cutting insert because of the fact that each point of the insert has an included angle of 60° and any two faces have an included angle of about 70°. Thus, the insert can be positioned in a tool holder so as to provide very steep positive rake angles. If desired, as much as 25° is optional for either side or back rake, and the other rake angle may have up to 15° positive.

From the standpoint of economy, aside from the universal indexability of an equilateral tetrahedron, this particular geometrical shape greatly reduces the volume of carbide required in the manufacture of the insert, as compared with other shapes of tool inserts having the same length of cutting edge. For example, extra heavy duty tools 1″ square x 1¼″ long have a volume of 1¼ cubic inches. Other tools known as heavy duty tools may, for example, be 1″ square x 3/16″ thick, 5/16″ thick, 7/16″ or 9/16″ thick. Their respective volumes are .1875 cubic inch, .3125 cubic inch, .4375 cubic inch, and .5625 cubic inch.

On the other hand, a tetrahedron with cutting edges 1″ long has a volume of only .118 cubic inch. It will be seen that even the 1″ square x 3/16″ thick tool referred to above, known as a "throw away" insert, exceeds the volume of the tetrahedron by more than 50%, at .1875 cubic inch.

The use of the tetrahedron insert of the present invention overcomes the disadvantages present in all of the prior conventional tools with which I am familiar, all of which have required a compromise and sacrifice of one desirable property in order to obtain another in larger measure. The tetrahedron combines all of the necessary and desirable features to a degree not even approached by any of the conventional designs.

In conclusion, the following advantages may be pointed out:

(1) The tetrahedron insert permits a minimum relief or clearance angle.

(2) It permits increased rake angles.

(3) No conventional insert shape of equal volume has as much carbide under the cutting edge to support the edge and to absorb heat.

(4) No conventional positive rake indexable insert having as many as four cutting edges can be used to undercut or to cut to a square shoulder, as can the tetrahedron insert.

(5) The tetrahedron permits a wider range of possible rake angles.

(6) It permits easier alteration of rake angles.

(7) No conventional insert of equal volume can withstand as great cutting pressures as the tetrahedron.

(8) The tetrahedron requires less clamping pressure to hold the insert in position.

(9) No conventional tool requires as few tool holders to cover as wide a variety of possible tool presentation angles.

(10) The tool holder for the tetrahedron is far easier to manufacture than other tool holders accommodating indexable inserts.

(11) No tool holder containing an equal or smaller volume of steel is stronger than one made for a tetrahedron.

(12) The combined clamp and chip breaker of the present invention permits a wider range of adjustment with fewer parts than conventional structures.

It may also be noted that the basic principle of this invention, the embodiment of a tetrahedron cutting element, may be used in connection with other single point tools whether designed for turning facing or boring. This same principle may also be employed on multiple point tools such as milling cutters. Even tools with inserts held by brazing, such as narrow saws where lack of room does not permit mechanical clamping, can be improved by use of this principle.

From the foregoing, it is believed that the invention may be readily understood by those skilled in the art without further description, it being borne in mind that numerous changes may be made in the details disclosed without departing from the spirit of the invention as set forth in the following claims.

I claim:

1. A metal cutting tool assembly comprising a solid cutting insert of tetrahedral shape, having four identical intersecting axes and four identical faces, respective pairs of which faces converge to form a maximum of six identical cutting edges, and a tool holder for said insert, including a head bounded on its top and front sides respectively, by converging tool presenting and clearance surfaces, a V-shaped insert receiving trough recessed in said head, transversely and angularly intersecting the front upper longitudinal edge and said converging surfaces of said head, said trough having a depth and angular side boundaries complementary to any two of the converging faces of said insert, to receive the latter with its other two converging faces substantially parallel with the respective adjacent converging surfaces of said head and present the cutting edge formed by said other two converging faces, in cutting position, the generally vertical axis of said V-shaped trough being coincident with that of said insert and the transverse angle of said trough with respect to said head, being such as to angularly present said insert to the material being worked on, with an optimum of mass support underlying its cutting edge, and means for firmly retaining said insert in place in said trough.

2. An assembly as claimed in claim 1, including fixed means attached to the clearance surface of said head for retaining the lower portion of said insert in place and means adjustably attachable to the tool presenting surface of said head for clamping said insert.

3. An assembly as claimed in claim 2, wherein said adjustable clamping means is provided with a chip breaking element.

4. A metal cutting tool assembly comprising a solid cutting insert of equilateral tetrahedral shape, the respective pairs of converging faces of which terminate in cutting edges, and a tool holder for said insert, including a head, a V-shaped insert receiving trough recessed in said head, the side walls of said trough being of a depth and relative angular disposition to receive and substantially completely underlie any two of the converging faces of said insert and present the selected exposed cutting edge formed by the opposite converging faces of said insert, in a plane substantially parallel with the longitudinal axis of said head, the base of said V-shaped trough being so angularly disposed transversely in said head, as to embrace said two first-named converging faces and position the front face of said opposite converging faces in a substantially perpendicular plane beneath said selected cutting edge, whereby said selected cutting edge is presented to the material being worked on with a maximum of underlying supporting mass which uniformly decreases rearwardly of the insert to a minimum, and means for securing said insert in said trough.

References Cited by the Examiner
FOREIGN PATENTS
4,465 12/74 Great Britain.

WILLIAM W. DYER, Jr., *Primary Examiner.*